(12) United States Patent
Kim et al.

(10) Patent No.: US 9,170,445 B2
(45) Date of Patent: Oct. 27, 2015

(54) LIQUID CRYSTAL DISPLAY DEVICE AND METHOD OF MANUFACTURING THE SAME

(71) Applicant: LG Display Co., Ltd., Seoul (KR)

(72) Inventors: Dong Guk Kim, Goyang-si (KR); Gee Sung Chae, Incheon (KR); Dongcheon Shin, Goyang-si (KR); Won Bong Jang, Seoul (KR); Joong Ha Lee, Paju-si (KR); Tae Hyoung Kwak, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 141 days.

(21) Appl. No.: 13/870,192

(22) Filed: Apr. 25, 2013

(65) Prior Publication Data

US 2014/0111746 A1     Apr. 24, 2014

(30) Foreign Application Priority Data

Oct. 22, 2012   (KR) .......................... 10-2012-0117161

(51) Int. Cl.
    *G02F 1/1333*     (2006.01)
    *G02F 1/1335*     (2006.01)

(52) U.S. Cl.
    CPC .... *G02F 1/133305* (2013.01); *G02F 1/133377* (2013.01); *G02F 1/133512* (2013.01)

(58) Field of Classification Search
    CPC .................. G02F 1/133394; G02F 1/133377; G02F 1/133512; G02F 1/133305
    See application file for complete search history.

(56) References Cited

U.S. PATENT DOCUMENTS

| | | | |
|---|---|---|---|
| 5,583,675 A * | 12/1996 | Yamada et al. ................. 349/84 |
| 2003/0002006 A1 * | 1/2003 | Freeman ....................... 349/156 |
| 2006/0109414 A1 * | 5/2006 | Liao et al. ..................... 349/158 |
| 2006/0209246 A1 * | 9/2006 | Kim .............................. 349/155 |
| 2006/0274220 A1 * | 12/2006 | Kim ................................ 349/56 |
| 2008/0068553 A1 * | 3/2008 | Tomita et al. ................. 349/153 |
| 2012/0075563 A1 * | 3/2012 | Takeda et al. ................. 349/139 |

\* cited by examiner

*Primary Examiner* — Dennis Y Kim
(74) *Attorney, Agent, or Firm* — Fenwick & West LLP

(57) ABSTRACT

Disclosed are a flexible liquid crystal display (LCD) device and a method of manufacturing the same. The flexible LCD device comprises a first flexible substrate and a second flexible substrate. A layer is disposed on the first flexible substrate and first pixel control lines are disposed on the second flexible substrate. The LCD device also includes polymer walls disposed between the first flexible substrate and the second flexible substrate that maintain a cell gap between the first flexible substrate and the second flexible substrate. The polymer walls are substantially aligned with the first pixel control lines and light transparent gaps in the layer disposed on the first flexible substrate.

13 Claims, 15 Drawing Sheets

LIQUID CRYSTAL DISPLAY DEVICE AND METHOD OF MANUFACTURING THE SAME

CROSS REFERENCE TO RELATED APPLICATIONS

This application claims the benefit of the Korean Patent Application No. 10-2012-0117161 filed on Oct. 22, 2012, which is hereby incorporated by reference in its entirety.

BACKGROUND

1. Field of the Disclosure

The present invention relates to a liquid crystal display (LCD) device, and more particularly, to a LCD device including a polymer wall for maintaining a cell gap.

2. Discussion of the Related Art

Owing to advantages such as good portability and low power consumption by low operating voltage, a liquid crystal display (LCD) device is widely used in various fields of notebook computer, monitor, spacecraft, aircraft, and etc.

The LCD device includes a lower substrate, an upper substrate, and a liquid crystal layer formed between the lower and upper substrates.

Recently, there is an increasing interest in flexible LCD device based on a flexible plastic substrate. The flexible LCD device is a rollable or windable device, which is paperlike, whereby the flexible LCD device enables easy keeping and good portability. Owing to these advantages, the flexible display device has been steadily studied and developed as a next-generation display device.

However, when curving or bending the flexible LCD device, it may have a problem related with non-uniformity in cell gap between the lower and upper substrates. In order to overcome this problem of non-uniformity in cell gap, there has been proposed a method of applying a polymer wall between the lower and upper substrates.

Hereinafter, a related art LCD device including a polymer wall will be described as follows.

FIG. 1A is a perspective view of a related art LCD device. FIG. 1B is a cross sectional view of the related art LCD device.

As shown in FIG. 1A, the related art LCD device includes a lower substrate 10, an upper substrate 20, polymer walls 30, and a liquid crystal 40.

The lower substrate 10 is arranged below the upper substrate 20, and the polymer walls 30 are formed in a matrix configuration between the lower substrate 10 and upper substrate 20. Also, the liquid crystal 40 is provided in a space between each of the polymer walls 30. Thus, even though the related art LCD device is repeatedly curved or bent, a cell gap between the lower substrate 10 and upper substrate 20 is uniformly maintained owing to the polymer walls 30.

The related art LCD device may be manufactured by processes of bonding the lower substrate 10 and upper substrate 20 to each other while providing a mixture of ultraviolet (UV)-curable compound and liquid crystal 40, and forming the polymer wall 30 having a desired shape by irradiating the UV-curable compound with UV light. According to the irradiation of UV light, the UV-curable compound is cured with a phase separation from the liquid crystal 40. Also, the liquid crystal 40 is positioned between each of the polymer walls 30. The polymer wall 30 will be described in detail with reference to FIG. 1B.

As shown in FIG. 1B, lines 12 are formed on the lower substrate 10 of the related art LCD device, and a passivation layer 14 is formed on the lines 12. On the upper substrate 20 of the related art LCD device, there are light-shielding layers 22, a color filter layer 24 between each of the light-shielding layers 22, and an overcoat layer 26 on the color filter layer 24. Also, the polymer walls 30 are formed between the lower substrate 10 and upper substrate 20, and the liquid crystal 40 is provided in the space between each of the polymer walls 30.

As described above, the polymer wall 30 is formed by irradiating the UV-curable compound with UV light. Thus, in order to form the polymer wall 30, the lower surface of the lower substrate 10 or the upper surface of the upper substrate 20 has to be irradiated with UV light.

However, the light-shielding layer 22 and color filter layer 24 formed on the upper substrate 20 have a low transmittance of UV light. Thus, if the upper surface of the upper substrate 20 is irradiated with UV light, it is difficult to form the polymer wall 30. Meanwhile, in case of a COT (color filter on TFT) structure in which the color filter is formed on the lower substrate 10, the polymer wall 30 may be formed by irradiating the upper surface of the upper substrate 20 with UV light. In this case, the structure of the LCD device is limited only to the COT structure.

For manufacturing various structures of a LCD device, the polymer wall 30 has to be formed by a UV irradiation onto the lower surface of the lower substrate 10. That is, as shown in the drawings, a mask 50 including a transparent portion 50a and a non-transparent portion 50b is positioned below the lower substrate 10, and then a UV irradiation is performed in such a manner that UV light is emitted from the lower side of the mask 50 to the lower surface of the lower substrate 10. Accordingly, the UV-curable compound is irradiated with UV light penetrating through the transparent portion 50a, thereby forming the polymer wall 30. In this case, the polymer wall 30 is formed in the same pattern as that of the transparent portion 50a of the mask 50.

In this case, the lines 12, such as gate lines or data lines, are formed on the lower substrate 10, and the UV light cannot penetrate through the lines 12. Accordingly, the transmission part 50a of the mask 50 is positioned to correspond with the other regions except the lines 12. As a result, the polymer wall 30 is formed in the other regions except the lines 12, that is, they are formed in a pixel region for displaying an image. Because the polymer wall 30 is formed in the pixel region for displaying an image, light transmittance of the LCD device is lowered, and thus luminance is also deteriorated.

SUMMARY

Accordingly, embodiments of the present invention are directed to an LCD device and a method of manufacturing the same that substantially obviate one or more problems due to limitations and disadvantages of the related art.

An aspect of embodiments of the present invention is directed to provide an LCD device and a method of manufacturing the same, which enables to manufacture various structures of LCD device owing to a polymer wall formed by a UV irradiation onto an upper surface of an upper substrate, and also prevents luminance deterioration owing to the polymer wall formed in a region corresponding to a gate line or data line.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

In one embodiment, disclosed is a flexible liquid crystal display (LCD) device comprising a first flexible substrate and a second flexible substrate. A layer is disposed on the first flexible substrate and first pixel control lines are disposed on the second flexible substrate. The LCD device also includes polymer walls disposed between the first flexible substrate and the second flexible substrate that maintain a cell gap between the first flexible substrate and the second flexible substrate. The polymer walls are substantially aligned with the first pixel control lines and light transparent gaps in the layer disposed on the first flexible substrate.

In one embodiment, the layer disposed on the first flexible substrate is a color filter layer and the light transparent gaps are gaps in the color filter layer. Alternatively, the layer disposed on the first flexible substrate is a light shielding layer and the light transparent gaps are gaps in the light shielding layer. In one embodiment, the light transparent gaps are transparent to ultraviolet (UV) light.

In one embodiment, the first pixel control lines are gate lines and the polymer walls are substantially aligned with the gate lines. Alternatively, the first pixel control lines are data lines and the polymer walls are substantially aligned with the data lines. In one embodiment, second pixel control lines are disposed on the second flexible substrate that cross the first pixel control lines, and the polymer walls are also substantially aligned with the second pixel control lines.

In one embodiment, the polymer walls are shaped as straight lines that are continuous across at least one of pixel columns or pixel rows. Alternatively, the polymer walls are shaped as straight lines that are discontinuous across at least one of pixel columns or pixel rows.

In one embodiment, a liquid crystal material is located between the polymer walls.

In one embodiment, a column spacer overlaps with the light transparent gaps and is disposed between the first flexible substrate and second flexible substrate. The column spacer may also be surrounded by the polymer walls.

In one embodiment, disclosed is a method of manufacturing a flexible LCD device. A first flexible substrate is prepared, wherein a layer is disposed on the first flexible substrate. A second flexible substrate is prepared, wherein first pixel control lines are disposed on the second flexible substrate. Polymer walls are formed between the first flexible substrate and the second flexible substrate that maintain a cell gap between the first flexible substrate and the second flexible substrate. The polymer walls are substantially aligned with the first pixel control lines and light transparent gaps in the layer disposed on the first flexible substrate.

In one embodiment of the method, a mixture of a light-curable compound and liquid crystal is provided between the first flexible substrate and the second flexible substrate. The polymer walls are then formed by exposing the mixture to light via the light transparent gaps in the layer disposed on the first flexible substrate.

In one embodiment of the method, the polymer walls are formed by exposing the mixture to ultraviolet (UV) light via the light transparent gaps in the layer disposed on the first flexible substrate. In one embodiment of the method, the polymer walls are formed by providing a mask having a mask pattern that matches the light transparent gaps; and exposing the mixture to light via the mask pattern of the mask and the light transparent gaps in the layer disposed on the first flexible substrate.

In one embodiment of the method, second pixel control lines are disposed on the second flexible substrate that cross the first pixel control lines, and the polymer walls are formed to be substantially aligned with the second pixel control lines.

In one embodiment, preparing the first flexible substrate comprises forming a column spacer disposed on the first flexible substrate that overlaps with the light transparent gaps in the first flexible substrate. Additionally, the polymer walls are formed to surround the column spacer.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Hereinafter, embodiments of the present invention will be described in detail with reference to the accompanying drawings.

Figure 1A:
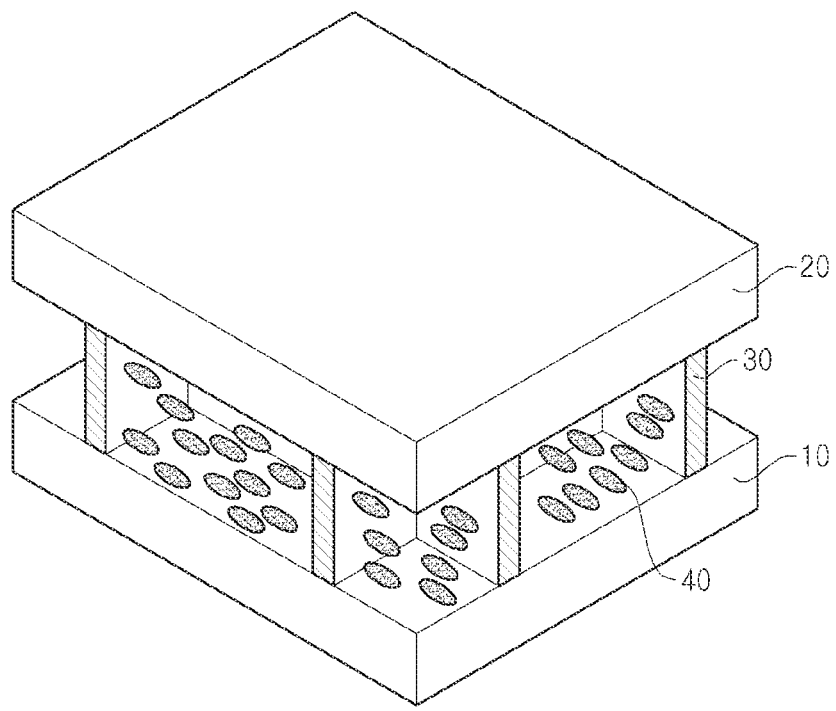
FIG. 1A is a perspective view schematically illustrating a related art LCD device.
Figure 1B:
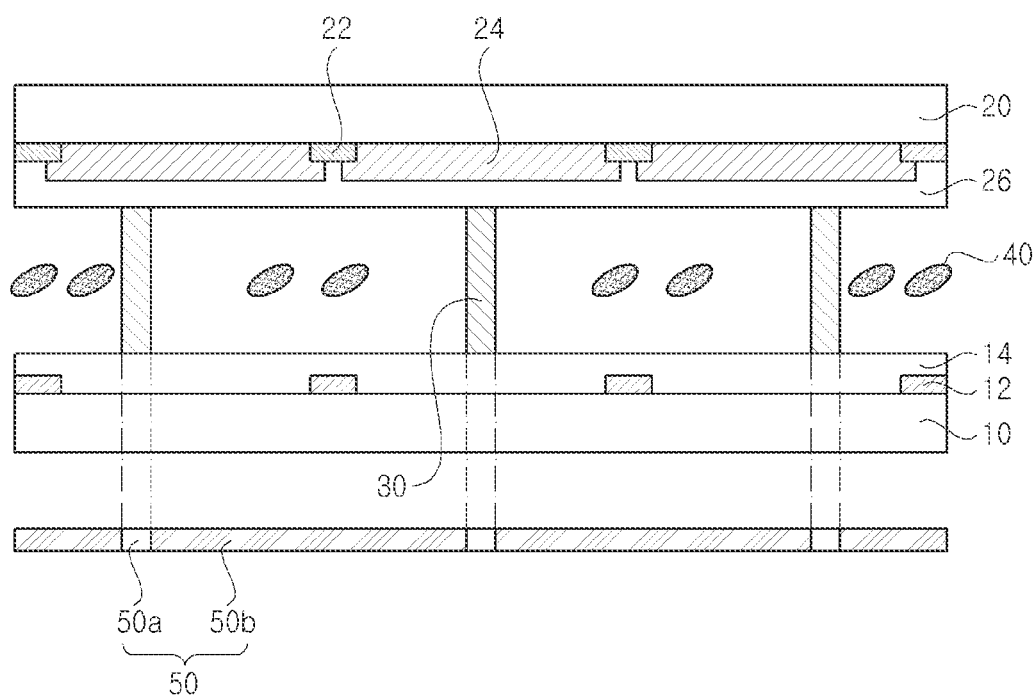
FIG. 1B is a cross sectional view schematically illustrating the related art LCD device.
Figure 2A:
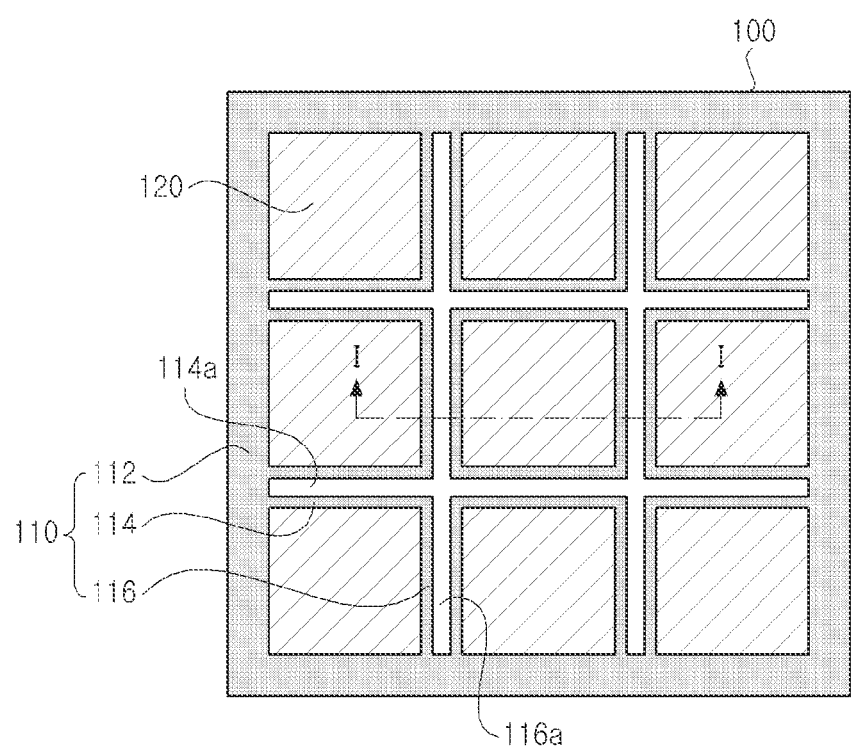
FIG. 2A is a plane view illustrating an upper substrate of an LCD device according to the first embodiment of the present invention.
Figure 2B:
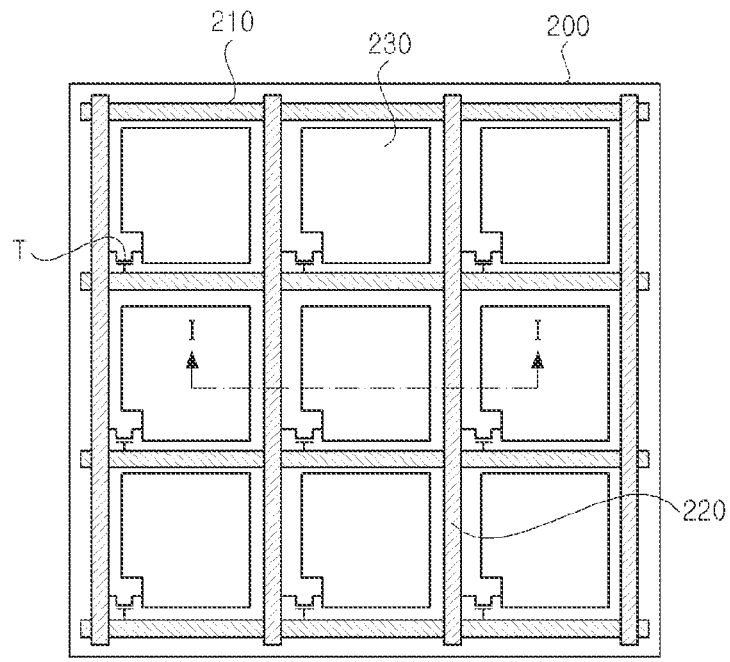
FIG. 2B is a plane view illustrating a lower substrate of the LCD device according to the first embodiment of the present invention.
Figure 2C:
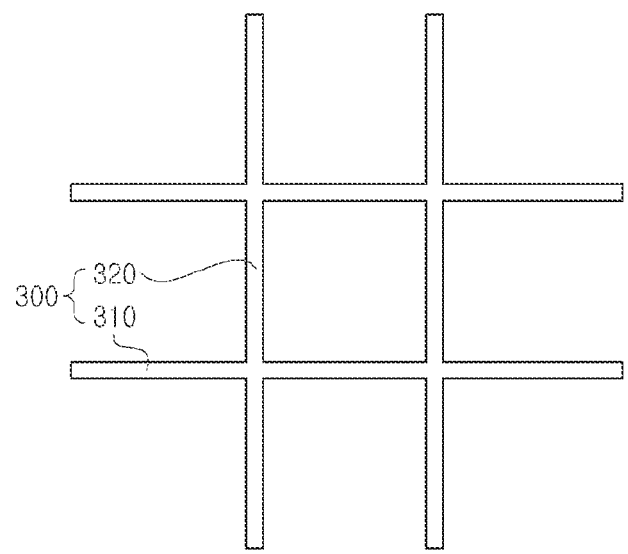
FIG. 2C is a plane view illustrating a polymer wall in the LCD device according to the first embodiment of the present invention.
Figure 2D:
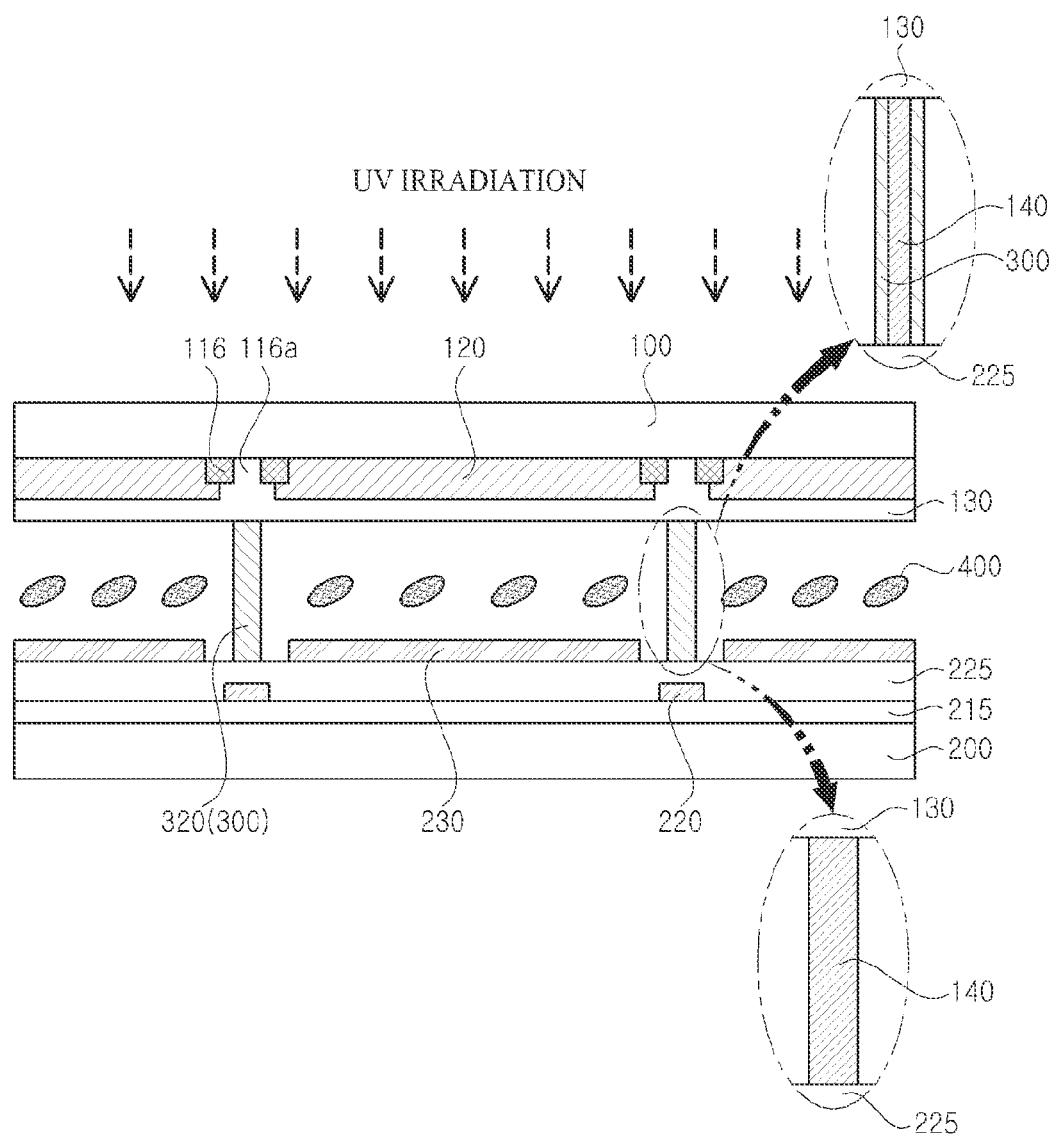
FIG. 2D is a cross sectional view of the LCD device according to the first embodiment of the present invention.

FIG. 2A is a plane view illustrating an upper substrate of an LCD device according to the first embodiment of the present invention, FIG. 2B is a plane view illustrating a lower substrate of the LCD device according to the first embodiment of the present invention, FIG. 2C is a plane view illustrating a polymer wall in the LCD device according to the first embodiment of the present invention, and FIG. 2D is a cross sectional view of the LCD device according to the first embodiment of the present invention.

As shown in FIG. 2A, on an upper substrate 100 of an LCD device according to the first embodiment of the present invention, there are a light-shielding layer 110, and a color filter layer 120 interspersed within the light-shielding layer 110.

The light-shielding layer 110 prevents light from leaking in other regions except a pixel region for displaying an image. The light-shielding layer 110 may include a first light-shielding pattern 112, a second light-shielding pattern 114, and a third light-shielding pattern 116.

The first light-shielding pattern 112 is formed in the circumference of the upper substrate 100. That is, the first light-shielding pattern 112 is formed at the four sides of the upper substrate 100, on which an image is not displayed.

The second light-shielding pattern 114 and third light-shielding pattern 116 are formed inside the first light-shielding pattern 112. That is, the second light-shielding pattern 114 and third light-shielding pattern 116 are formed in the center of the upper substrate 100, on which an image is displayed.

The second light-shielding pattern 114 is formed in a first direction, for example, a horizontal direction which is the same direction as that of a gate line on a lower substrate of the LCD device. The third light-shielding pattern 116 is formed in a second direction which is different from the first direction, for example, a vertical direction which is the same direction as that of a data line on the lower substrate of the LCD device.

Inside the second light-shielding pattern 114, there is a light transparent part 114a that is transparent to UV light. Also, a light transparent part 116a is provided inside the third light-shielding pattern 116. UV light penetrates through the light transparent part 116a. Light transparent part 114a and light transparent part 116a are gaps in the light shielding layer 110 and/or color filter layer 120. When considered together or alone, light transparent part 114a and light transparent part 116a form a light transparent pattern that is transparent to UV light.

Accordingly, when the upper surface of the upper substrate 100 is irradiated with UV light, the UV light may not penetrate through the regions corresponding to the light-shielding layer 110 and color filter layer 120, but the UV light may easily penetrate through the light transparent parts 114a and 116a. As a result, a polymer wall to be described may be formed in a pattern that corresponds to and matches the pattern of light transparent parts 114a and 116a.

As shown in FIG. 2B, the gate lines 210 and data lines 220 crossing each other are formed on the lower substrate 200 of the LCD device, to thereby define a plurality of pixels. Gate lines and data lines carry pixel control signals for controlling the operation of the pixels. As used herein, the term pixel control lines may be used to refer to either the gate lines 210 or the data lines 220.

The gate lines 210 are parallel to each other and formed in the first direction, for example, the horizontal direction which is the same direction as that of the aforementioned second light-shielding pattern 114. The data lines 220 are parallel to each other and formed in the second direction which is different from the first direction, for example, the vertical direction which is the same direction as that of the aforementioned third light-shielding pattern 116.

At crossing regions of the gate lines 210 and data lines 220, there are thin film transistors T which function as switching elements. The thin film transistors T are electrically connected to their respective pixel electrodes 230.

In one embodiment, the detailed structure of the upper substrate 100 and lower substrate 200 may be different depending on a driving mode of the LCD device, for example, Twisted Nematic (TN) mode, Vertical Alignment (VA) mode, In-Plane Switching (IPS) mode, Fringe Field Switching (FFS) mode, and etc.

As shown in FIG. 2C, the polymer wall 300 of the LCD device according to the first embodiment of the present invention may include a first wall pattern 310, and a second wall pattern 320.

The polymer wall 300 is formed in the pattern which corresponds to the light transparent parts 114a and 116a included in the aforementioned second light-shielding pattern 114 and third light-shielding pattern 116. That is, the first wall pattern 310 is arranged in the first direction, that is, the direction which is the same direction as that of the light transparent part 114a included in the second light-shielding pattern 114. First wall pattern 310, gate lines 210, and light transparent part 114a are all substantially aligned with each other. The second wall pattern 320 is arranged in the second direction, that is, the direction which is the same as that of the light transparent part 116a included in the third light-shielding pattern 116. Second wall pattern 320, data lines 220, and light transparent part 116a are all substantially aligned with each other.

Hereinafter, a cross sectional structure of the LCD device according to the first embodiment of the present invention and a method of manufacturing the same will be described with reference to FIG. 2D.

As shown in FIG. 2D, the third light-shielding pattern 116 including the light transparent part 116a therein is formed on the upper substrate 100, and the color filter layer 120 is formed in the gaps between each of the third light-shielding patterns 116. The upper substrate 100 may be formed of flexible plastic.

The color filter layer 120 may overlap with the third light-shielding pattern 116, but the color filter layer 120 is not overlapped with the light transparent part 116a. If the color filter layer 120 extends to the light transparent part 116a, it is difficult to obtain a desired pattern of the polymer wall 300. For this reason, the color filter layer 120 is not overlapped with the light transparent part 116a.

An overcoat layer 130 may be formed on the color filter layer 120. If the LCD device is a TN mode or VA mode, a common electrode may be formed instead of the overcoat layer 130.

As shown in an expanded part of FIG. 2D, a column spacer 140 is formed on the overcoat layer 130. The column spacer 140 is provided to maintain an initial cell gap before forming the polymer wall 300. The column spacer 140 is bonded to the upper substrate 100, but is not bonded to the lower substrate 200.

The column spacer 140 may be formed in a non-display area, for example, an area for the gate line or data line. That is, the column spacer 140 may overlap with the light transparent part 116a. Accordingly, if a width of the column spacer 140 is smaller than the light transparent part 116a, as shown in an upper expanded part of FIG. 2D, the column spacer 140 may be surrounded by the polymer wall 300. However, if a width of the column spacer 140 is larger than the light transparent part, as shown in a lower expanded part of FIG. 2D, the column spacer 140 is not surrounded by the polymer wall 300.

Meanwhile, the column spacer 140 may be formed in a region which does not correspond to the gate line or data line, for example, the column spacer 140 may be formed in a region of forming the thin film transistor.

As shown in the following description about the embodiments of the present invention, the light transparent part may not be formed in the region which corresponds to some parts of the gate line or data line. In this case, the column spacer 140 may be formed in the gate line or data line which corresponds to the region where the light transparent part is not formed.

A gate insulating film 215 is formed on the lower substrate 200, and the data line 220 is formed on the gate insulating film 215. The lower substrate 200 may be formed of flexible plastic. Also, a passivation film 225 is formed on the data line 220, and a pixel electrode 230 is formed on the passivation film 225. If the LCD device is an IPS mode, the pixel electrode 230 may be formed in a finger structure, and a common electrode may be additionally provided in parallel to the pixel electrode 230.

The polymer wall 300 for maintaining the cell gap is formed between the upper substrate 100 and lower substrate 200, and liquid crystal 400 is provided between each of the polymer walls 300.

The polymer wall 300 overlaps and is aligned with the light transparent part 116a included in the third light-shielding pattern 116 on the upper substrate 100. Also, the polymer wall 300 overlaps and is aligned with the data line 220 on the lower substrate 200. Since the polymer wall 300 overlaps and is aligned with the data line 220, light transmittance of the LCD device is not lowered by the polymer wall 300.

A method of manufacturing the LCD device according to the first embodiment of the present invention will be described in detail as follows.

First, the aforementioned upper substrate 100 and lower substrate 200 are prepared.

Then, while a mixture of UV-curable compound and liquid crystal 400 is provided to a space between the upper substrate 100 and lower substrate 200, the upper substrate 100 and lower substrate 200 are bonded to each other. The mixture may include additional photo-initiator. The UV-curable compound and photo-initiator may be formed of various materials generally known to those in the art.

A bonding process of the upper substrate 100 and lower substrate 200 may be carried out by a vacuum injection method or liquid crystal dispensing method. In case of the vacuum injection method, after the upper substrate 100 and lower substrate 200 are attached to each other by the use of sealant having an inlet, the mixture of UV-curable compound and liquid crystal 400 is injected through the inlet under the vacuum state. In case of the liquid crystal dispensing method, after the mixture of UV-curable compound and liquid crystal 400 is dispensed on any one of the upper substrate 100 and lower substrate 200, the upper substrate 100 and lower substrate 200 are attached to each other by the use of sealant without an inlet.

Then, the UV-curable compound is cured by a UV irradiation onto the upper surface of the upper substrate 100. That is, when UV light is irradiated onto the upper surface of the upper substrate 100 without using an additional mask, UV light is incident on the UV-curable compound through the light transparent parts 114a and 116a included in the light-shielding layer 110. Thus, the UV-curable compound is cured with a phase separation from the liquid crystal 400, whereby the polymer wall 300 is formed, and the liquid crystal 400 is formed between each of the polymer walls 300.

Even though the light transmittance is lowered, there is a possibility that UV light may penetrate through the color filter layer 120. In this case, a desired shape of the polymer wall 300 may not be obtained. In one embodiment, an additional mask is positioned above the upper substrate 100 for controlling the irradiation of UV light onto the upper surface of the upper substrate 100. In this case, the additional mask may be provided with a transparent mask pattern whose pattern is the same as and matches that of the light transparent part 114a and 116a.

As described above, the present invention is advantageous in that it can be applied to various types of LCD device owing to the UV irradiation onto the upper surface of the upper substrate 100. Especially, because the light-shielding layer 110 and color filter layer 120 are used as a mask, the UV irradiation is carried out without an additional mask, whereby it is possible to reduce a cost and to simplify a manufacturing process.

Second, third, and fourth embodiments of a LCD device will now be described herein by reference to FIGS. 3A, 3B, 4A, 4B, 5A and 5B. The second, third and fourth embodiments are similar to the first embodiment of FIG. 2A through 2D, except that the light-shielding layer 110 and polymer wall 300 now have a different pattern than that of the first embodiment.

Figure 3A:
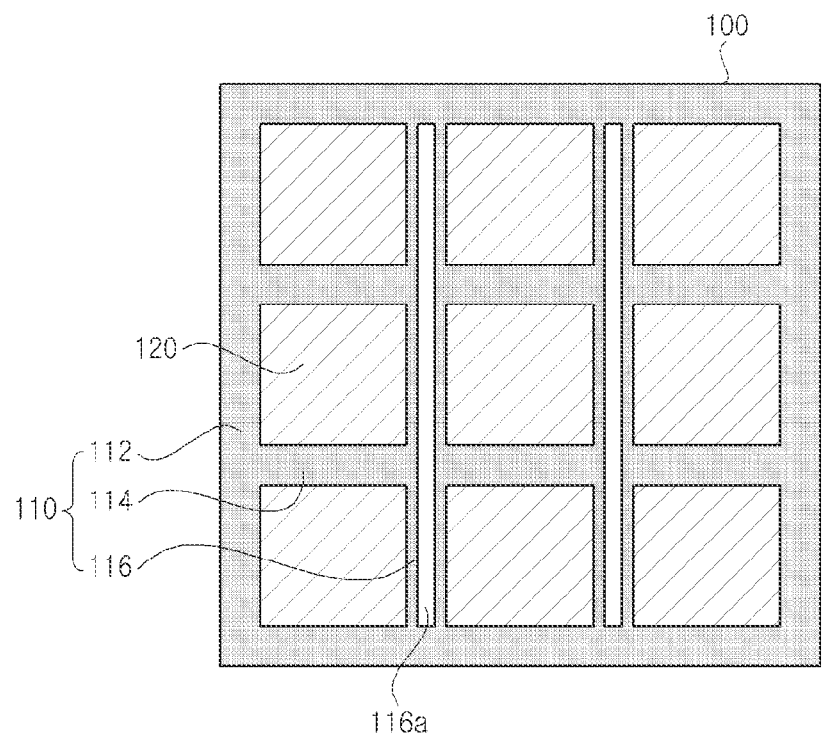
FIG. 3A is a plane view illustrating an upper substrate of an LCD device according to the second embodiment of the present invention.
Figure 3B:
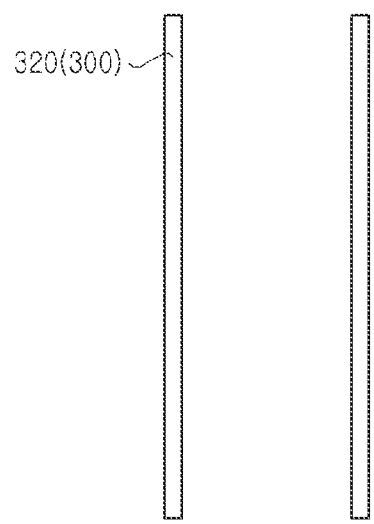
FIG. 3B is a plane view illustrating a polymer wall in the LCD device according to the second embodiment of the present invention.

FIG. 3A is a plane view illustrating an upper substrate of an LCD device according to the second embodiment of the present invention. FIG. 3B is a plane view illustrating a polymer wall in the LCD device according to the second embodiment of the present invention.

According to the second embodiment of the present invention, as shown in FIG. 3A, a light-shielding layer 110 is formed on an upper substrate 100, and a color filter layer 120 is formed in the gaps of the light-shielding layers 110.

The light-shielding layer 110 may include a first light-shielding pattern 112, a second light-shielding pattern 114, and a third light-shielding pattern 116.

The second light-shielding pattern 114 is not provided with a light transparent part, and the third light-shielding pattern 116 is provided with a light transparent part 116a. Thus, when the upper surface of the upper substrate 100 is irradiated with UV light, UV light penetrates through the light transparent part 116a included in the third light-shielding pattern 116.

Eventually, as shown in FIG. 3B, a polymer wall 300 in the LCD device according to the second embodiment of the present invention comprises a second wall pattern 320 which corresponds to the light transparent part 116a included in the third light-shielding pattern 116.

Figure 4A:
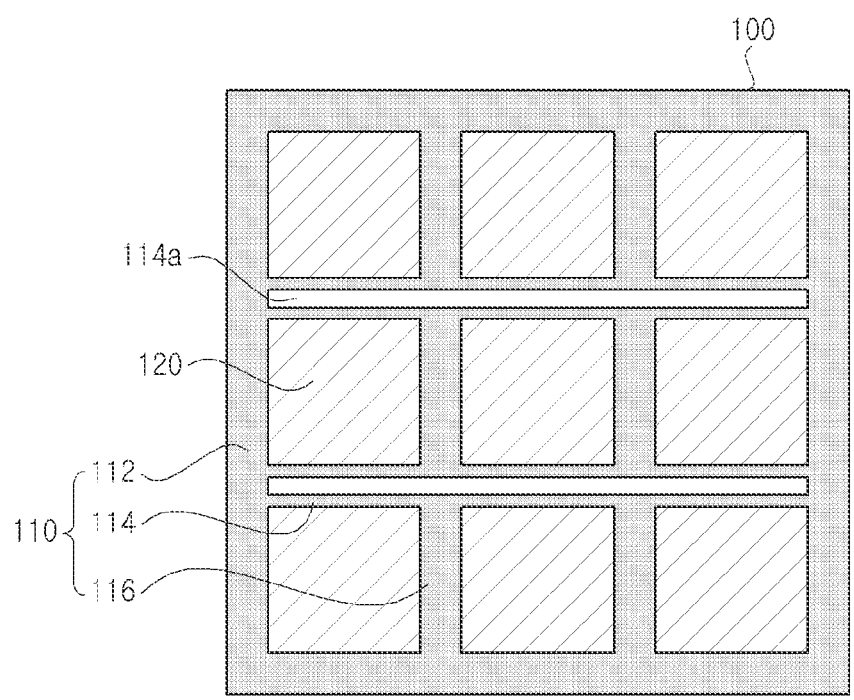
FIG. 4A is a plane view illustrating an upper substrate of an LCD device according to the third embodiment of the present invention.
Figure 4B:
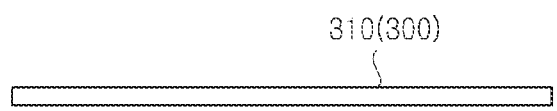
FIG. 4B is a plane view illustrating a polymer wall in the LCD device according to the third embodiment of the present invention.

FIG. 4A is a plane view illustrating an upper substrate of an LCD device according to the third embodiment of the present invention. FIG. 4B is a plane view illustrating a polymer wall in the LCD device according to the third embodiment of the present invention.

According to the third embodiment of the present invention, as shown in FIG. 4A, a light-shielding layer 110 is formed on an upper substrate 100, and a color filter layer 120 is formed between each of the light-shielding layers 110.

The light-shielding layer 110 may include a first light-shielding pattern 112, a second light-shielding pattern 114, and a third light-shielding pattern 116.

The second light-shielding pattern 114 is provided with a light transparent part 114a, and the third light-shielding pattern 116 is not provided with a light transparent part. Thus, when the upper surface of the upper substrate 100 is irradiated with UV light, UV light penetrates through the light transparent part 114a included in the second light-shielding pattern 114.

Eventually, as shown in FIG. 4B, a polymer wall 300 in the LCD device according to the third embodiment of the present invention comprises a first wall pattern 310 which corresponds to the light transparent part 114a included in the second light-shielding pattern 114.

Figure 5A:
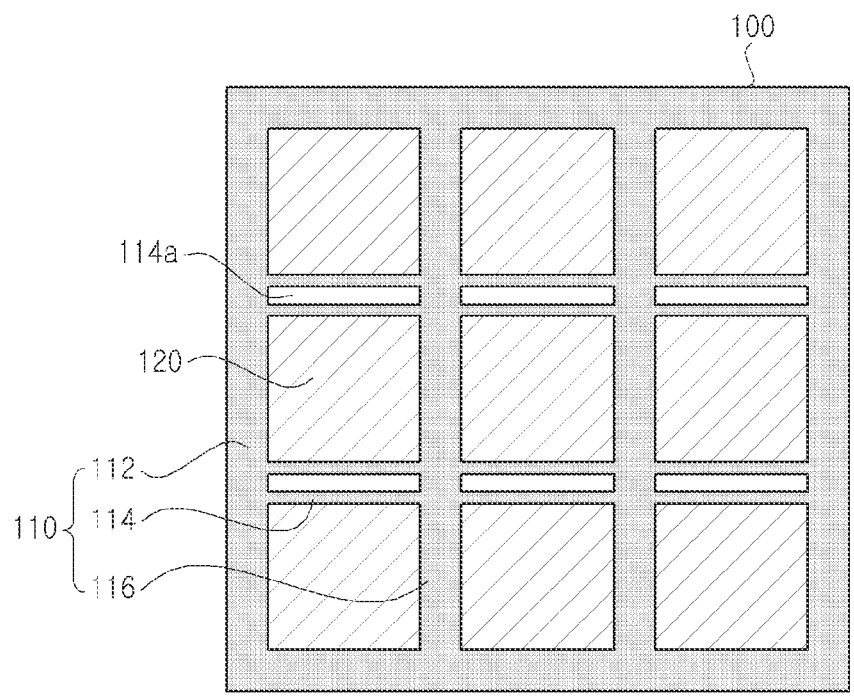
FIG. 5A is a plane view illustrating an upper substrate of an LCD device according to the fourth embodiment of the present invention.
Figure 5B:
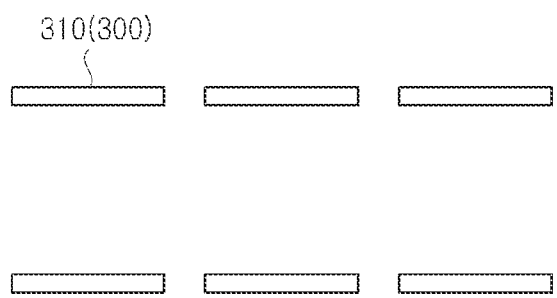
FIG. 5B is a plane view illustrating a polymer wall in the LCD device according to the fourth embodiment of the present invention.

FIG. 5A is a plane view illustrating an upper substrate of an LCD device according to the fourth embodiment of the present invention. FIG. 5B is a plane view illustrating a polymer wall in the LCD device according to the fourth embodiment of the present invention.

According to the fourth embodiment of the present invention, as shown in FIG. 5A, a light-shielding layer 110 is formed on an upper substrate 100, and a color filter layer 120 is formed between each of the light-shielding layers 110.

The light-shielding layer 110 may include a first light-shielding pattern 112, a second light-shielding pattern 114, and a third light-shielding pattern 116.

The second light-shielding pattern 114 is provided with a light transparent part 114a, and the third light-shielding pattern 116 is not provided with a light transparent part.

The light transparent part 114a is not formed in a crossing region of the second light-shielding pattern 114 and third light-shielding pattern 116. Thus, the light transparent part 114a is formed in a discontinuous straight line that has multiple segments. That is, according to the aforementioned third embodiment of the present invention, the light transparent part 114a is formed in a cross region of the second light-shielding pattern 114 and third light-shielding pattern 116, whereby the light transparent part 114a is formed in a continuous straight line that is continuous across different pixel columns. However, in case of the fourth embodiment of the present invention, the light transparent part 114a is not formed in the crossing region of the second light-shielding pattern 114 and third light-shielding pattern 116, whereby the light transparent part 114a is formed in the discontinuous straight line that is discontinuous across different pixel columns.

Eventually, as shown in FIG. 5B, a polymer wall 300 in the LCD device according to the fourth embodiment of the present invention comprises a first wall pattern 310 of a discontinuous straight line which corresponds to the light transparent part 114a included in the second light-shielding pattern 114. The discontinuous straight line includes several segments that are discontinuous across different pixel columns.

In the above second embodiment of FIG. 3A, although not shown, the light transparent part 116a may not be formed in a crossing region of the second light-shielding pattern 114 and third light-shielding pattern 116, that is, the light transparent part 116a may be formed in a discontinuous straight line that is discontinuous across different pixel rows, whereby the second wall pattern 320 may be a discontinuous straight line that is discontinuous across different pixel rows.

Figure 6A:
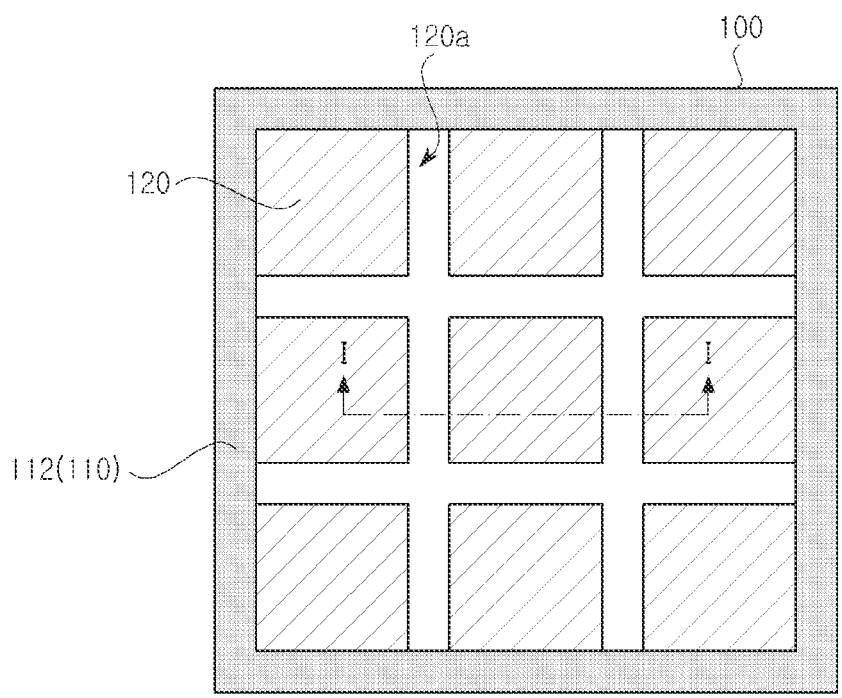
FIG. 6A is a plane view illustrating an upper substrate of an LCD device according to the fifth embodiment of the present invention.
Figure 6B:
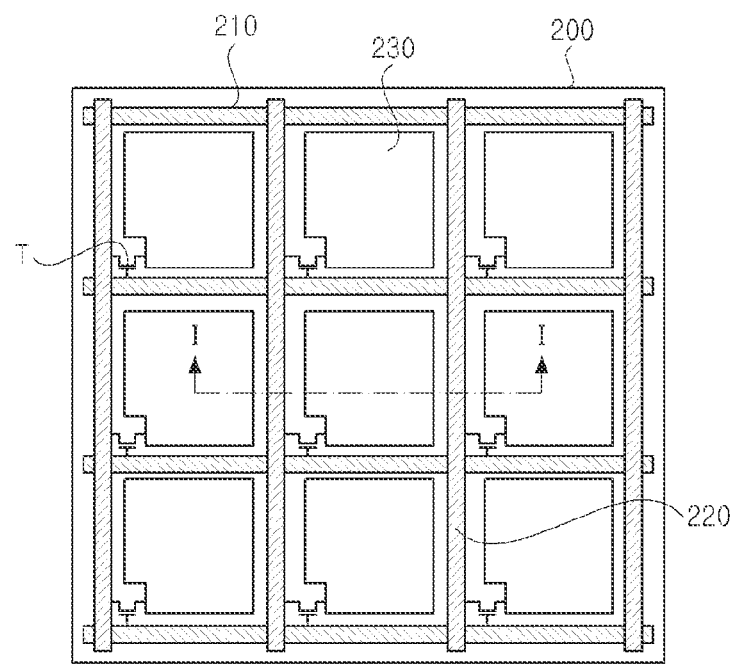
FIG. 6B is a plane view illustrating a lower substrate of the LCD device according to the fifth embodiment of the present invention.
Figure 6C:
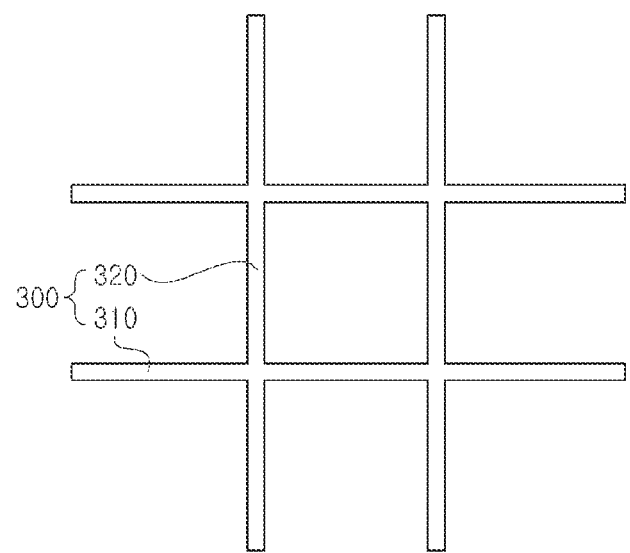
FIG. 6C is a plane view illustrating a polymer wall in the LCD device according to the fifth embodiment of the present invention.
Figure 6D:
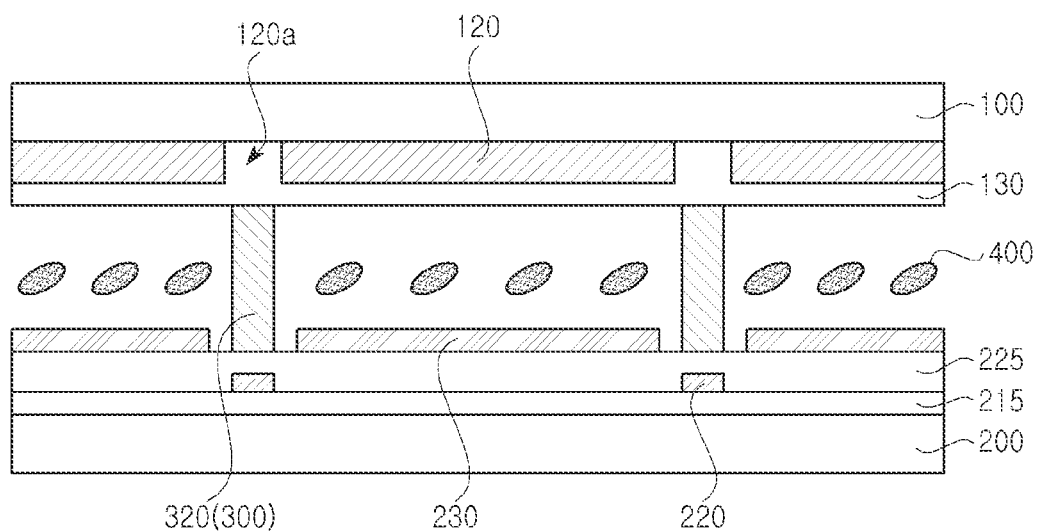
FIG. 6D is a cross sectional view of the LCD device according to the fifth embodiment of the present invention.

FIG. 6A is a plane view illustrating an upper substrate 100 of an LCD device according to the fifth embodiment of the present invention, FIG. 6B is a plane view illustrating a lower substrate 200 of the LCD device according to the fifth embodiment of the present invention, FIG. 6C is a plane view illustrating a polymer wall 300 in the LCD device according to the fifth embodiment of the present invention, and FIG. 6D is a cross sectional view of the LCD device according to the fifth embodiment of the present invention, wherein FIG. 6D is a cross sectional view along I-I of FIGS. 6A and 6B. The fifth embodiment is similar to the first embodiment of FIG. 2A-2D, but the light-shielding layer 110 now has a different appearance. For the following description, a detailed explanation for structures that have already been described for the first embodiment will be omitted.

As shown in FIG. 6A, a light-shielding layer 110 and a color filter layer 120 are formed on an upper substrate 100 of an LCD device according to the fifth embodiment of the present invention.

The light-shielding layer 110 is not formed in the center of the upper substrate 100 on which an image is displayed. That is, the light-shielding layer 110 may comprise a first light-shielding pattern 112 which is formed in the circumference of the upper substrate 100.

The color filter layer 120 is formed to correspond with a plurality of pixels. The color filter layer 120 is not formed in a boundary region between each of the pixels, and more particularly, in a region corresponding to a gate line 210 and data line 220 on a lower substrate 200. That is, the color filter layer 120 includes a light transparent part 120a which is formed in a region corresponding to the gate line 210 and data line 220. Thus, when the upper surface of the upper substrate 100 is irradiated with UV light, UV light easily penetrates through the light transparent part 120a of the color filter layer 120. As a result, a polymer wall 300 may be formed in a pattern corresponding to the pattern of the light transparent part 120a.

As shown in FIG. 6B, the gate lines 210 and data lines 220 crossing each other are formed on the lower substrate 200 of the LCD device according to the fifth embodiment of the present invention, wherein the gate lines 210 are arranged in a first direction, and the data lines 220 are arranged in a second direction. At a crossing region of the gate lines 210 and data lines 220, there are thin film transistors T. The thin film transistors T are electrically connected to their respective pixel electrodes 230.

As shown in FIG. 6C, the polymer wall 300 in the LCD device according to the fifth embodiment of the present invention may include a first wall pattern 310, and a second wall pattern 320.

The polymer wall 300 is formed in a pattern which corresponds to the light transparent part 120a. That is, the first wall pattern 310 is arranged in the first direction, that is, the direction which is the same direction as that of the light transparent part 120a corresponding to the gate line 210, and the second wall pattern 320 is arranged in the second direction, that is, the direction which is the same as that of the light transparent part 120a corresponding to the data line 220.

Hereinafter, a cross sectional structure of the LCD device according to the fifth embodiment of the present invention and a method of manufacturing the same will be described with reference to FIG. 6D.

As shown in FIG. 6D, the color filter layer 120 including the light transparent part 120a therein is formed on the upper substrate 100, and an overcoat layer 130 is formed on the color filter layer 120.

A gate insulating film 215 is formed on the lower substrate 200, and the data line 220 is formed on the gate insulating film 215. Also, a passivation film 225 is formed on the data line 220, and a pixel electrode 230 is formed on the passivation film 225.

The polymer wall 300 for maintaining the cell gap is formed between the upper substrate 100 and lower substrate 200, and liquid crystal 400 is provided between each of the polymer walls 300.

The polymer wall 300 may overlap with the light transparent part 120a included in the color filter layer 120 on the upper substrate 100. Also, the polymer wall 300 may overlap with the data line 220 on the lower substrate 200.

Hereinafter, a method of manufacturing the LCD device according to the fifth embodiment of the present invention will be described in detail as follows.

First, the aforementioned upper substrate 100 and lower substrate 200 are prepared.

While a mixture of UV-curable compound and liquid crystal 400 is provided to a space between the upper substrate 100 and lower substrate 200, the upper substrate 100 and lower substrate 200 are bonded to each other. The mixture may include additional photo-initiator.

Then, the UV-curable compound is cured by irradiating UV light onto the upper surface of the upper substrate 100. That is, when UV light is irradiated onto the upper surface of the upper substrate 100, UV light is incident on the UV-curable compound through the light transparent part 120a included in the color filter layer 120. Thus, the UV-curable compound is cured with a phase separation from the liquid crystal 400, whereby the polymer wall 300 is formed, and the liquid crystal 400 is formed between each of the polymer walls 300.

Sixth, seventh, eighth and ninth embodiments of a LCD device will now be described herein by reference to FIGS. 7A, 7B, 8A, 8B, 9A, 9B, 10A and 10B. The sixth, seventh, eight, and ninth embodiments are similar to the fifth embodiment of FIG. 6A through 6D, except that the color filter layer 120, light-shielding layer 110 and polymer wall 300 now have a different pattern than that of the fifth embodiment.

Figure 7A:
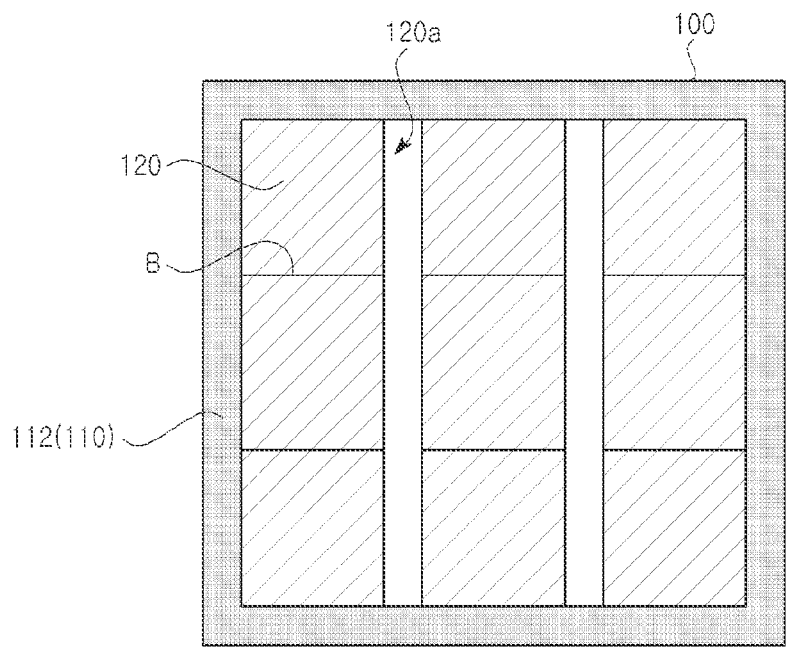
FIG. 7A is a plane view illustrating an upper substrate of an LCD device according to the sixth embodiment of the present invention.
Figure 7B:
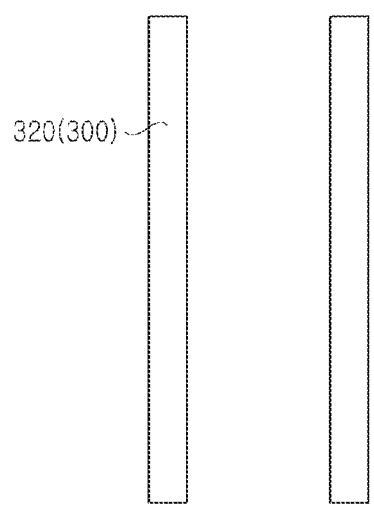
FIG. 7B is a plane view illustrating a polymer wall in the LCD device according to the sixth embodiment of the present invention.

FIG. 7A is a plane view illustrating an upper substrate 100 of an LCD device according to the sixth embodiment of the present invention, and FIG. 7B is a plane view illustrating a polymer wall 300 in the LCD device according to the sixth embodiment of the present invention.

According to the sixth embodiment of the present invention, as shown in FIG. 7A, a light-shielding layer 110 including a first light-shielding pattern 112 is formed in the circumference of an upper substrate 100, and a color filter layer 120 is formed in the center of the upper substrate 100.

The color filter layer 120 includes a light transparent part 120a therein. In this case, the light transparent part 120a is not formed in a region corresponding to a gate line 210 of a lower substrate 200, and the light transparent part 120a is formed in a region corresponding to a data line 220.

That is, the color filter layer 120 is not formed in a boundary region between each of the pixels in a row of pixels arranged along a horizontal direction. However, the color filter layer 120 is formed in a boundary region (B) between each of the pixels in a column of pixels arranged along a vertical direction.

Thus, when the upper surface of the upper substrate 100 is irradiated with UV light, UV light easily penetrates through the light transparent part 120a which is formed in the region corresponding to the data line 220.

As a result, as shown in FIG. 7B, a polymer wall 300 in the LCD device according to the sixth embodiment of the present invention may include a second wall pattern 320 corresponding to the light transparent part 120a included in the aforementioned color filter layer 120.

Figure 8A:
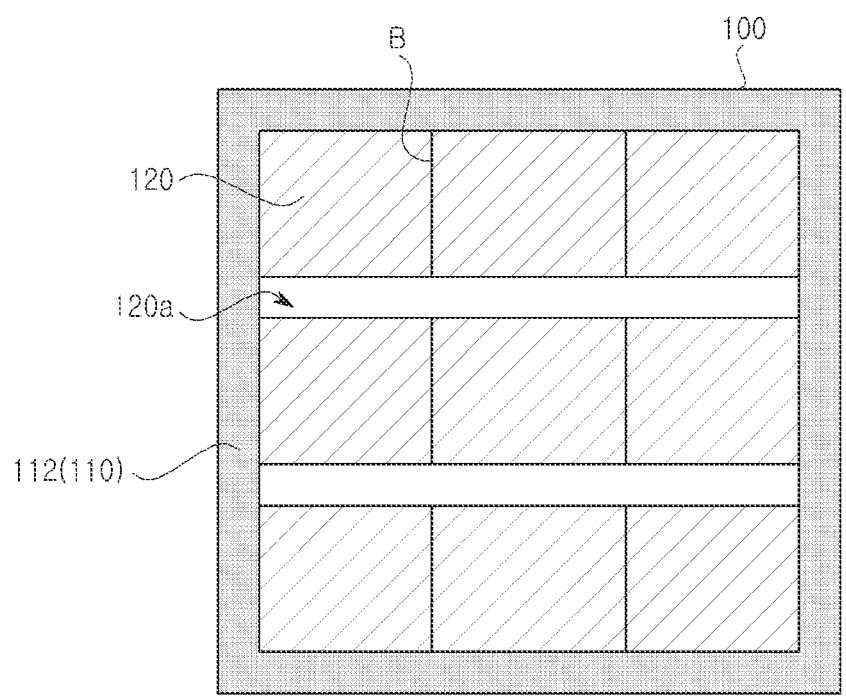
FIG. 8A is a plane view illustrating an upper substrate of an LCD device according to the seventh embodiment of the present invention.
Figure 8B:
FIG. 8B is a plane view illustrating a polymer wall in the LCD device according to the seventh embodiment of the present invention.
Figure 8B:
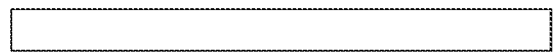

FIG. 8A is a plane view illustrating an upper substrate 100 of an LCD device according to the seventh embodiment of the present invention, and FIG. 8B is a plane view illustrating a polymer wall 300 in the LCD device according to the seventh embodiment of the present invention.

According to the seventh embodiment of the present invention, as shown in FIG. 8A, a light-shielding layer 110 including a first light-shielding pattern 112 is formed in the circumference of an upper substrate 100, and a color filter layer 120 is formed in the center of the upper substrate 100.

The color filter layer 120 includes a light transparent part 120a therein. In this case, the light transparent part 120a is formed in a region corresponding to a gate line 210 of a lower substrate 200, and the light transparent part 120a is not formed in a region corresponding to a data line 220.

That is, the color filter layer 120 is formed in a boundary region (B) between each of the pixels in a row of pixels arranged along a horizontal direction. However, the color filter layer 120 is not formed in a boundary region between each of the pixels in a column of pixels arranged along a vertical direction.

Thus, when the upper surface of the upper substrate 100 is irradiated with UV light, UV light easily penetrates through the light transparent part 120a which is formed in the region corresponding to the gate line 210.

As a result, as shown in FIG. 8B, a polymer wall 300 in the LCD device according to the seventh embodiment of the present invention may include a first wall pattern 310 corresponding to the light transparent part 120a included in the aforementioned color filter layer 120.

Figure 9A:
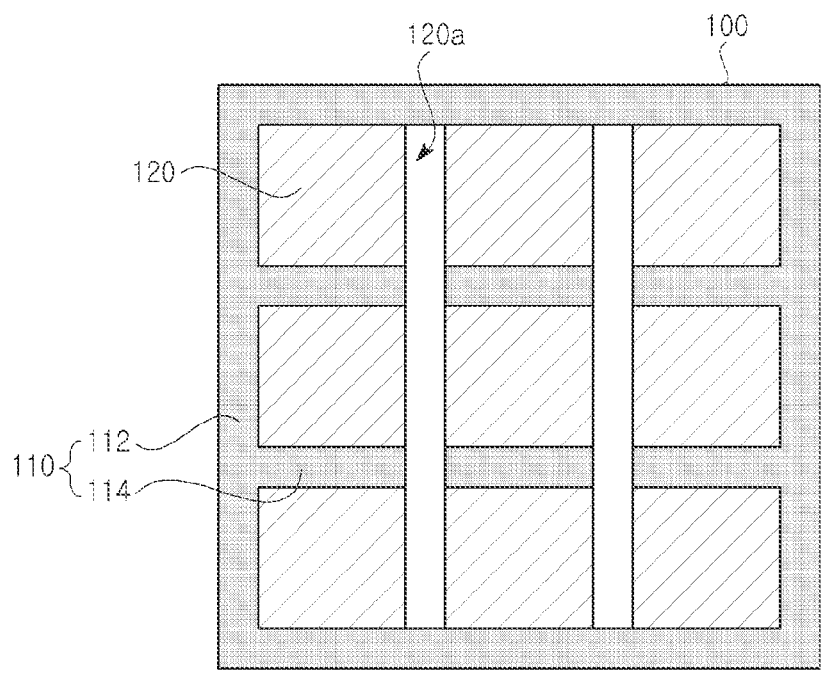
FIG. 9A is a plane view illustrating an upper substrate of an LCD device according to the eighth embodiment of the present invention.

FIG. 9A is a plane view illustrating an upper substrate of an LCD device according to the eighth embodiment of the present invention, and FIG. 8B is a plane view illustrating a polymer wall in the LCD device according to the eighth embodiment of the present invention.

According to the eighth embodiment of the present invention, as shown in FIG. 9A, a light-shielding layer 110 and a color filter layer 120 are formed on an upper substrate 100.

The light-shielding layer 110 may include a first light-shielding pattern 112 formed in the circumference of the upper substrate 100, and a second light-shielding pattern 114 formed in the center of the upper substrate 100.

The color filter layer 120 includes a light transparent part 120a therein. In this case, the light transparent part 120a is formed in a region corresponding to a data line 220 of a lower substrate 200, that is, a region where the second light-shielding pattern 114 is not formed.

Thus, when the upper surface of the upper substrate 100 is irradiated with UV light, UV light easily penetrates through the light transparent part 120a which is formed in the region corresponding to the data line 220.

Figure 9B:
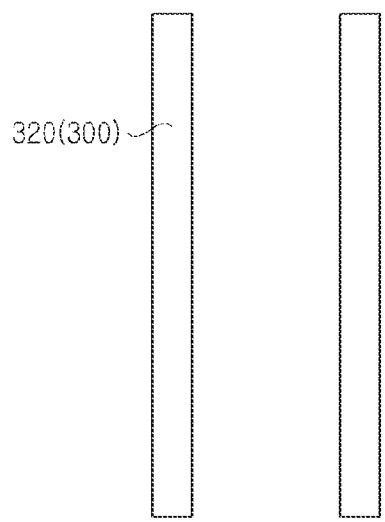
FIG. 9B is a plane view illustrating a polymer wall in the LCD device according to the eighth embodiment of the present invention.

As a result, as shown in FIG. 9B, a polymer wall 300 in the LCD device according to the eighth embodiment of the present invention may include a second wall pattern 320 corresponding to the light transparent part 120a included in the aforementioned color filter layer 120.

Although not shown in FIG. 9A, the light-shielding layer 110 may include a third light-shielding pattern 116 arranged in a second (vertical) direction, instead of the second light-shielding pattern 114 arranged in a first (horizontal) direction.

In this case, a finally-obtained polymer wall 300 may include a first wall pattern arranged in the first (horizontal) direction.

Figure 10A:
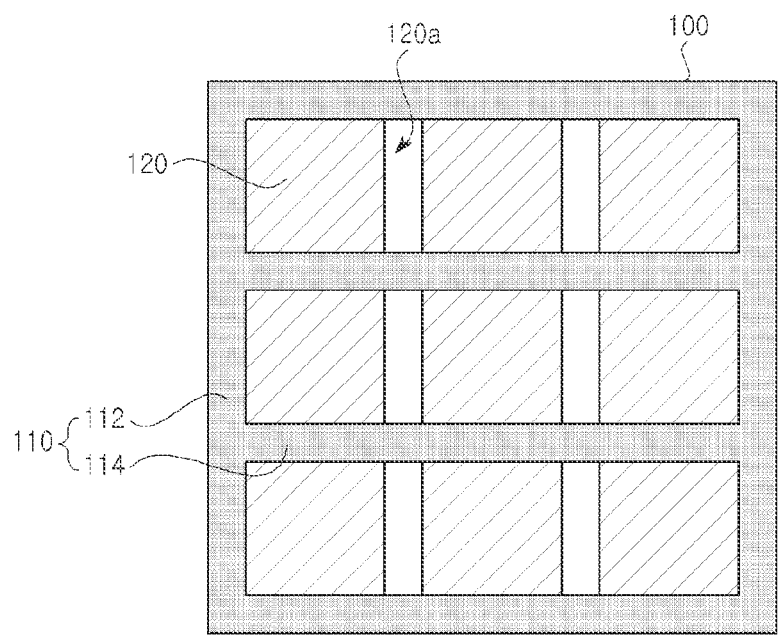
FIG. 10A is a plane view illustrating an upper substrate of an LCD device according to the ninth embodiment of the present invention.
Figure 10B:
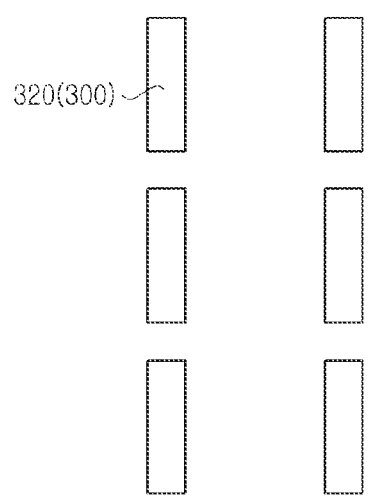
FIG. 10B is a plane view illustrating a polymer wall in the LCD device according to the ninth embodiment of the present invention.

FIG. 10A is a plane view illustrating an upper substrate of an LCD device according to the ninth embodiment of the present invention, and FIG. 10B is a plane view illustrating a polymer wall in the LCD device according to the ninth embodiment of the present invention.

According to the ninth embodiment of the present invention, as shown in FIG. 10A, a light-shielding layer 110 and a color filter layer 120 are formed on an upper substrate 100.

The light-shielding layer 110 may include a first light-shielding pattern 112 formed in the circumference of the upper substrate 100, and a second light-shielding pattern 114 formed in the center of the upper substrate 100.

In the aforementioned eighth embodiment of the present invention, the second light-shielding pattern 114 is formed in a discontinuous straight line that is discontinuous across pixel columns, and thus the light transparent part 120a included in the color filter layer 120 is formed in a continuous straight line that is continuous across pixel rows. Thus, the polymer wall 300 includes the second wall pattern 320 which is formed in a continuous straight line.

On the contrary, according to the ninth embodiment of the present invention, the second light-shielding pattern 114 is formed in a continuous straight line that is continuous across pixel columns, and thus a light transparent part 120a is formed in a discontinuous straight line that is discontinuous across difference pixel rows. As a result, as shown in FIG. 10B, a polymer wall 300 includes a second wall pattern 320 which is formed in a discontinuous straight line that includes several segments and is also discontinuous across different pixel rows.

Although not shown in FIG. 10A, the light-shielding layer 110 may include a third light-shielding pattern 116 arranged in a second (vertical) direction, instead of the second light-shielding pattern 114 arranged in a first (horizontal) direction. In this case, a finally-obtained polymer wall may include a first wall pattern arranged in the first (vertical) direction.

According to embodiments of the present invention, since the polymer wall 300 may overlap with the gate line 210 or data line 220, light transmittance of the LCD device is not lowered by the polymer wall 300. Also, the UV irradiation may be applied to the upper surface of the upper substrate 100, whereby it may be applied to the manufacturing process of the various structures of the LCD device.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A flexible liquid crystal display (LCD) device comprising:
   a first flexible substrate;
   a layer disposed on the first flexible substrate;
   a second flexible substrate;
   first pixel control lines disposed on the second flexible substrate, the first pixel control lines being at least one of data lines or gate lines; and
   polymer walls disposed between the first flexible substrate and the second flexible substrate that maintain a cell gap between the first flexible substrate and the second flexible substrate, wherein the polymer walls are substantially aligned with and overlap with the first pixel control lines and light transparent gaps in the layer disposed on the first flexible substrate, both the polymer walls and the light transparent gaps in the layer being discontinuous across at least one of pixel columns or pixel rows.

2. The LCD device of claim 1, wherein the layer disposed on the first flexible substrate is a color filter layer and the light transparent gaps are gaps in the color filter layer.

3. The LCD device of claim 1, wherein the layer disposed on the first flexible substrate is a light shielding layer and the light transparent gaps are gaps in the light shielding layer.

4. The LCD device of claim 1, wherein the first pixel control lines are gate lines and the polymer walls are substantially aligned with the gate lines.

5. The LCD device of claim 1, wherein the first pixel control lines are data lines and the polymer walls are substantially aligned with the data lines.

6. The LCD device of claim 1, wherein the light transparent gaps are transparent to ultraviolet (UV) light.

7. A flexible liquid crystal display (LCD) device comprising:
   a first flexible substrate;
   a layer disposed on the first flexible substrate;
   a second flexible substrate;
   first pixel control lines disposed on the second flexible substrate; and
   polymer walls disposed between the first flexible substrate and the second flexible substrate that maintain a cell gap between the first flexible substrate and the second flexible substrate, wherein the polymer walls are substantially aligned with the first pixel control lines and light transparent gaps in the layer disposed on the first flexible substrate, both the polymer walls and the light transparent gaps shaped as straight lines that are discontinuous across at least one of pixel columns or pixel rows.

8. The LCD device of claim 1, further comprising:
   a liquid crystal material located between the polymer walls.

9. A flexible liquid crystal display (LCD) device comprising:
   a first flexible substrate;
   a layer disposed on the first flexible substrate;
   a second flexible substrate;
   first pixel control lines disposed on the second flexible substrate;
   polymer walls disposed between the first flexible substrate and the second flexible substrate that maintain a cell gap between the first flexible substrate and the second flexible substrate, wherein the polymer walls are substantially aligned with the first pixel control lines and light transparent gaps in the layer disposed on the first flexible substrate; and
   a column spacer disposed between the first flexible substrate and second flexible substrate and overlapping with a light transparent gap of the light transparent gaps, a width of the column spacer being smaller than a width of the light transparent gap and the column spacer being surrounded by a polymer wall of the polymer walls.

10. A method of manufacturing a flexible liquid crystal display (LCD) device, comprising:
    preparing a first flexible substrate, wherein a layer is disposed on the first flexible substrate;
    preparing a second flexible substrate, wherein first pixel control lines are disposed on the second flexible substrate;
    providing a mixture of a light-curable compound and liquid crystal between the first flexible substrate and the second flexible substrate;

providing a mask having a mask pattern that matches light transparent gaps in the layer disposed on the first flexible substrate; and forming polymer walls between the first flexible substrate and the second flexible substrate that maintain a cell gap between the first flexible substrate and the second flexible substrate, the polymer walls being substantially aligned with the first pixel control lines and the light transparent gaps in the layer disposed on the first flexible substrate, the polymer walls formed by exposing the mixture to light via the mask pattern of the mask and the light transparent gaps in the layer disposed on the first flexible substrate.

11. The method of claim 10, wherein forming the polymer walls comprises:

forming the polymer walls by exposing the mixture to ultraviolet (UV) light via the light transparent gaps in the layer disposed on the first flexible substrate.

12. The method of claim 10, wherein second pixel control lines that cross the first pixel control lines are disposed on the second flexible substrate, and where the polymer walls are formed to be substantially aligned with the second pixel control lines.

13. A method of manufacturing a flexible liquid crystal display (LCD) device, comprising:

preparing a first flexible substrate, wherein a layer is disposed on the first flexible substrate and a column spacer is disposed on the first flexible substrate that overlaps with a light transparent gap of light transparent gaps in the layer, a width of the column spacer being smaller than a width of the light transparent gap; and preparing a second flexible substrate, wherein first pixel control lines are disposed on the second flexible substrate; and forming polymer walls between the first flexible substrate and the second flexible substrate that maintain a cell gap between the first flexible substrate and the second flexible substrate, the polymer walls being substantially aligned with the first pixel control lines and the light transparent gaps in the layer disposed on the first flexible substrate, the column spacer being surrounded by a polymer wall of the polymer walls.

* * * * *